Patented Jan. 12, 1937

2,067,866

UNITED STATES PATENT OFFICE 2,067,866

ERGOT-DERIVED PRODUCT AND PROCESS OF OBTAINING IT

Elmer H. Stuart, Indianapolis, Ind., assignor to Eli Lilly and Company, Indianapolis, Ind., a corporation of Indiana No Drawing. Application November 18, 1936, Serial No. 111,487

10 Claims. (Cl. 167—67)

This present application is a continuation in part of my co-pending application Serial No. 617,070, filed June 13, 1932. It sets forth the same process and the same product as described in that parent application, and differs therefrom only in setting forth certain properties of the product which have been ascertained since the filing of such parent application.

It is the object of my invention to improve and simplify the extraction of ergot, and to obtain an increased yield in terms of units of physiological potency.

In doing this, I also obtain a product which seems to be new in itself. Although it has substantially the same general physiological properties as other extracts of ergot and as the alkaloids ergotoxine and ergotamine in that like them it is effective to control hermorrhages of the puerperal uterus, yet it is markedly different from all previously known ergot preparations in many vital respects, both chemically and clinically, as will be pointed out more at length hereinafter.

I have discovered that the active principle of ergot, or at least an active principle (or principles) thereof which has the fundamental physiological properties commonly identified with ergot, is very readily soluble in liquid ammonia, and can be extracted simply and expeditiously from the ergot, with a high yield, and even without the necessity for grinding the ergot. A solid containing this active principle in crude form may be obtained directly from such liquid-ammonia solution. The active principle may be obtained in purer form by various purification processes.

In carrying out my process, the proportions used may be varied quite widely, as specific proportions are for the most part incidental. Therefore, the proportions which I give in the following examples are merely illustrative.

The following is an example of my process:

To 20 pounds of ergot, conveniently whole and unground but not necessarily so, are added about 25 pounds of liquid ammonia. The ergot thus treated may be used directly as obtained on the market, but preferably I first defat it, as by extraction with gasoline, as I find that that gives an increased yield; but such preliminary defatting operation is not essential.

After the liquid ammonia has stood on the ergot for an hour or two, it is drawn off. Then another 25 pounds or so of liquid ammonia are added to the already once-extracted ergot, and allowed to stand for another hour or two, and drawn off, and may be added to the first liquid-ammonia extract obtained. If desired, the extraction may be carried further, by further treatment of the already twice-extracted ergot with liquid ammonia, but usually two or at most three extractions are sufficient to obtain as great a yield as is economically practical.

The extraction of the ergot with the liquid ammonia requires no special apparatus. It may be carried out in any ordinary open-top percolator or other receptacle, but desirably one of the usual type of percolator which is provided with a valved opening at the bottom for drawing off the extract. The evaporation of some of the ammonia keeps the remainder of the ammonia sufficiently cold to remain liquid, so that no increase in pressure beyond atmospheric pressure is needed to maintain such liquidity. The walls of the percolator or other container are conveniently heat-insulated, in any usual manner, to minimize absorption of heat from the surrounding atmosphere and thus to minimize the loss in volume of liquid ammonia by reason of evaporation. The apparatus is desirably located under a hood, to dispose of that portion of the ammonia which evaporates.

The combined liquid-ammonia extract, which is reddish-brown in color, contains a physiologically active principle (or principles) of the ergot. If desired, this combined extract may be simply evaporated to dryness, to give a solid residue which contains such active principle (or principles). Such evaporation is desirably under vacuum, in order to obtain a solid residue substantially free from ammonia. The evaporation may be carried out in any desired apparatus, with or without recovery of the evaporated ammonia. The heat for the evaporation may be simply that from the atmosphere, if slow evaporation is all that is wanted; or may be accelerated by supplying heat in any usual manner of supplying heat for evaporation. Of course, for acceleration of the evaporation it is desirable that the container in which the evaporation is carried out shall not have the insulated walls which are desirable for the container in which the extraction is carried out. To ensure stability, I prefer to acidify before all the ammonia has been removed, conveniently by adding tartaric acid when the total volume of the extract has been reduced under vacuum to about one-twentieth of the volume of the original extractive.

The solid residue thus obtained from 20 lbs. of ergot ordinarily weighs about 2 lbs. It is very crude, and contains much contaminant. But it can be used to make a liquid extract highly potent in ergot activity, and physiological assay by the usual methods, such as the cock's-comb method (the official method of the U. S. Pharmacopoeia, Tenth Decennial Revision, 1926) and the Broom and Clark method, shows that the yield in units of potency is ordinarily close to the full activity of the original ergot.

To get the alkaloids (for I consider the hemorrhage-controlling active principles of ergot to be alkaloids) relatively free from contaminant, I prefer to proceed as follows: Instead of evaporating the combined liquid-ammonia extract to dryness, I first merely reduce its volume until most of the ammonia is evaporated off, to leave a rather thick extract. I extract this thick liquid-ammonia extract with pure ether, desirably two or three times, conveniently shaking to facilitate the extraction. For each ether-extraction I use about a gallon of pure ether; although the amount of ether may vary over a considerable range. The ether removes most if not all of the active principle (or principles) of the ergot from the liquid ammonia. On standing, the ether, which now contains the active principle (or principles) in the form of the alkaloidal base, separates from the liquid ammonia by rising to the top, and may easily be poured off.

This ether solution containing the active principle is then desirably treated to remove any residual traces of ammonia. This may be done by warming the ether; or it may be done by adding a little water, which on shaking absorbs any ammonia present but on standing promptly separates from the ether. The small amount of water necessary to remove the ammonia removes little if any of the active principle.

The ether solution contains the active principle (or principles) of the ergot, but also contains some of the contaminants that were present in the liquid-ammonia solution. For further purification, I extract the ether solution with weakly acidulated water, desirably several times. While other acids may be used for acidulating the water, I prefer tartaric acid, about 10 grams of it in a liter of water for the first extraction, and usually only about one or two grams of it in 200 to 500 cc. of water for the second and third extractions. The acid neutralizes the alkaloidal bases present in the ether solution, to form salts which are soluble in water but insoluble in ether; so that these salts are taken up by the water. These salts include the active principle. On standing, the water and the ether separate; and the water may be drawn off through a separatory funnel.

I now add an equal volume (about 1.5 to 2 liters) of ether to the water solution, and make the mixture barely alkaline to litmus, as by adding sodium bicarbonate. On this alkalinization, the salt of the desired active principle is decomposed to free the alkaloidal base, which is taken up by the ether; but by making the alkalinization just barely sufficient to turn litmus blue the greater part of the other salts which are present in the water solution remain in the water. The water and the ether are allowed to separate, by standing, and the ether is decanted off. This ether solution contains the active principle (or principles) in the form of the alkaloidal base, in fairly pure state.

If desired, the ether extraction of the water solution may be repeated once or twice, with about 800 to 1000 cc. of ether after the first extraction. All the ether extracts are combined, and washed with a small amount of water to remove any contaminating salts which may have been carried into the ether from the water solution.

The combined ether solution is now dried, as with anhydrous sodium sulphate, to make it substantially water-free. This combined ether solution, which has a total volume of about 2.5 liters, is reduced in volume by evaporation to about 750 cc. Then an ether solution of tartaric acid is added until no more precipitate forms. The precipitate is separated from the liquid, as by filtration followed by drying in a vacuum desiccator to remove any residual ether.

The solid thus obtained from 20 pounds of a good grade of ergot (say one assaying 200% U. S. P.) ordinarily weighs about six grams; but the amount of this solid will be less for poorer grades of ergot. This solid is the tartrate of the alkaloid base (or bases). It is an amorphous powder slightly brownish in color. When dissolved in either absolute alcohol or in acetone, (if the tartaric acid used was the usual dextro-rotatory tartaric acid) it is markedly dextro-rotatory, many times more so than can be accounted for by the amount of tartaric acid present, and much more so than are the tartrates of the known ergot alkaloids ergo-toxine and ergotamine; for its specific optical rotation is usually of the order of $$[\alpha]_D^{25°} +100°,$$

varying somewhat with different lots of ergot.

The free base (or bases) is readily obtained from this tartrate by known methods of obtaining alkaloidal bases from tartrates. It is clinically effective on either oral or parenteral administration to control hemorrhage of the postpartum uterus; and for such control in human mothers the oral dose ordinarily is not required to be larger than 1 mg.

That free base (or bases) is sufficiently soluble in chloroform to form a solution of which the optical rotation is definite and measurable. When so dissolved in chloroform, that free base is levo-rotary, but with a specific optical rotation of the order of $$[\alpha]_D^{25°} - 34°,$$

as contradistinguished from the specific optical rotations of the known ergot alkaloids ergotoxine and ergotamine in chloroform, which are of the order of $$[\alpha]_D^{25°} -160°.$$

Part of this free base (or bases) is water-soluble. So a water extract of that free base (or bases) may be made. That water extract is substantially water-white, but it exhibits a strong blue-violet fluorescence that is characteristic of ergot alkaloids; and turns to a deep blue when tested with a solution of paradimethyl-aminobenzaldehyde in sulfuric acid (the M. I. Smith color reagent that characteristically indicates ergot alkaloids). This water extract is amply concentrated for measurements of optical rotation; and that water extract of the free alkaloidal base, unlike the chloroform solution thereof, is dextro-rotatory. This sharply contradistinguishes it from the ergot alkaloids ergotoxine and ergotamine; which are so insoluble in water that it is impossible to obtain a water solution thereof which is either clinically effective or optically active. This reversal of optical rotation, from levo in chloroform to dextro in water, is a distinguishing characteristic of my free base (or bases); and thus distinguishes it from all previously known clinically effective ergot alkaloids.

The melting point of the tartrate of my free base (or bases) is not sharp. The tartrate begins to soften and shrink at about 130° C., turns successively brownish, grayish, and blackish as the temperature is raised until it chars at about 151° C., and melts very indefinitely between 168° C. and 185° C.

The tartrate is water-soluble, especially if there is a slight excess of tartaric acid, and may be used to form an aqueous solution which is suitable and effective for hypodermic injection. This water solution is somewhat unstable and in the course of months loses physiological activity. The dry tartrate and the dry base both seem to be fairly stable if protected from the air and light. The base is fairly soluble in ether. Both the base and the salt are soluble in dilute alcohol; these alcoholic solutions also are not entirely stable.

The base and its salts, the aqueous and the dilute-alcohol solutions of the salt, and the dilute-alcohol solution of the base, all have the physiological properties commonly identified with ergot, as tested by the cock's-comb method of the U. S. Pharmacopoeia, 10th Decennial Revision. The dry base and its dry salts have as great a potency, weight for weight, as have ergotoxine and ergotamine and their salts, as tested by said cock's-comb method.

However, the alkaloidal base which I obtain, and its salts, are distinguished from the known ergot alkaloids ergotoxine and ergotamine, as well as from the well-known fluid extract of ergot, in many vital respects. Among these are the following:

1. My ergot tartrate is usually clinically effective on oral administration to control hemorrhage of the puerperal uterus, within five to fifteen minutes, in doses which ordinarily need be no larger than 1.0 mg.; whereas the salts of ergotoxine and ergotamine, and the total solids of fluid extract of ergot U. S. P., are all substantially clinically ineffective to produce that prompt control in oral doses of 1.0 mg. It requires an oral dose of the order of 200 to 300 mg. of the total solids of the fluid extract of ergot U. S. P. for clinical effectiveness; and the salts of ergotoxine and ergotamine are relatively slow-acting, at a time when a few minutes may mean the difference between life and death. These facts, as well as the other clinical and pharmacological activities stated in this application, have been determined by observations on puerperal human mothers, by successful clinical use of my material by various obstetricians in the actual control of puerperal hemorrhage. Clinical observations have been supplemented by tests on experimental animals, by the uterine-bag method (described in the British Medical Journal for June 4, 1932, page 1022, and for June 18, 1932, page 1119) by which my ergot tartrate has been shown to produce uterine contractions of definite character and magnitude with doses of only approximately one-fourth to one-fifth of the dose necessary of salts of ergotoxine or ergotamine to produce corresponding effects.

2. When tested with Mayer's reagent, the tartrate of my alkaloidal base gives a negative reaction in a dilution of 1:80,000 whereas ergotamine tartrate and ergotoxine tartrate give a definitely positive reaction at that dilution.

3. An orally effective clinical dose (1.0 mg.) of my ergot tartrate, in solution in 80 cc. of water to make a dilution of 1:80,000, is negative when tested by Mayer's reagent, as is stated above; whereas an orally effective clinical dose (2 cc.) of fluid extract of ergot (U. S. P.), when likewise diluted to 80 cc., gives a very strong positive test with Mayer's reagent.

4. My free base is sufficiently soluble both in chloroform and in water to form solutions of which the optical rotation is definite and measurable. A chloroform solution of my free base is optically levo-rotatory, while a water extract of it is optically dextro-rotatory; whereas ergotoxine and ergotamine, while levo-rotatory in chloroform solution, are too insoluble in water to yield a water extract which has an optical rotation.

5. A dilute water extract of my free base induces powerful rhythmic contractions, with increase in tone, of the isolated uterus of the virgin rabbit and of the virgin guinea pig; it reduces the peristaltic movements of the isolated small intestine of the rabbit, with prompt recovery; and it dilates the pupil of the eye of the living rabbit. These effects on the isolated organs of the rabbit can be prevented by the previous application of either ergotamine or ergotoxine to those isolated organs.

These results are evidence of stimulation of the sympathetic nervous system by my product; while ergotamine and ergotoxine both have the opposite effect, of depression and paralysis of that sympathetic nervous system.

I claim as my invention:

1. The step in the process of producing an extract of ergot, which consists in extracting whole ergot with liquid ammonia.

2. The step in the process of producing an extract of ergot, which consists in extracting ergot with liquid ammonia.

3. The process which consists in extracting ergot with liquid ammonia, and separating from the liquid-ammonia extract a solid having physiological properties associated with ergot.

4. The process which consists in extracting ergot with liquid ammonia, and separating from the liquid-ammonia extract a substantially ammonia-free material having physiological properties associated with ergot.

5. The process which consists in extracting ergot with liquid ammonia, extracting the liquid-ammonia extract with ether, and obtaining from the ether extract a substantialy ether-free material having physiological properties associated with ergot.

6. The process which consists in extracting ergot with liquid ammonia, extracting the liquid-ammonia extract with ether, and obtaining from the ether extract a salt having physiological properties associated with ergot.

7. The process which consists in extracting ergot with liquid ammonia, extracting the liquid-ammonia extract with ether, extracting the ether extract with acidulated water, re-extracting the water solution with ether under barely alkaline conditions, and obtaining from the resultant ether solution a substantially ether-free material having physiological properties associated with ergot.

8. An ergot-derived substance, which in the form of the tartrate is usually effective on oral administration to produce prompt control of puerperal hemorrhage in human mothers in doses which are not greater than 1.0 mg.; and which in the form of a base dissolves sufficiently in chloroform to form a solution which is optically levo-rotatory, and dissolves sufficiently in water to form a solution which is optically dextrorotatory.

9. An ergot-derived substance, which in the form of the tartrate is usually effective on oral administration to produce prompt control of puerperal hemorrhage in human mothers in doses which are not greater than 1.0 mg., and gives a negative reaction to Mayer's reagent in a dilution of 1:80,000.

10. An ergot-derived substance, which in the form of the tartrate is usually effective on oral administration to produce prompt control of puerperal hemorrhage in human mothers in doses which are not greater than 1.0 mg.; and which in the form of a base dissolves sufficiently in water to yield a water extract which induces powerful rhythmic contractions, with increase in tone, of the isolated uterus of the virgin rabbit and of the virgin guinea pig, reduces the peristaltic movements of the isolated small intestine of the rabbit, with prompt recovery, and is prevented from causing these effects on the isolated organs of the rabbit by the previous application of either ergotamine or ergotoxine to those isolated organs.

ELMER H. STUART.